June 6, 1972  C. N. KLAHR  3,667,829
ELECTRO-OPTIC PHASE MODULATOR

Filed March 30, 1970   3 Sheets-Sheet 1

Inventor
Carl N. Klahr
By Browdy and Neimark
Attorneys

June 6, 1972     C. N. KLAHR     3,667,829

ELECTRO-OPTIC PHASE MODULATOR

Filed March 30, 1970     3 Sheets-Sheet 3

Inventor

Carl N. Klahr

By Broudy and Neimark
Attorneys 3,667,829
ELECTRO-OPTIC PHASE MODULATOR
Carl N. Klahr, 678 Cedar Lawn Ave.,
Lawrence, N.Y. 11559
Filed Mar. 30, 1970, Ser. No. 23,696
Int. Cl. G02f 1/28, 1/36
U.S. Cl. 350—160　　　　　　　　　　　　　　　18 Claims

ABSTRACT OF THE DISCLOSURE

This invention is an electro-optical phase modulator comprising (a) a medium whose index of refraction can be varied by the injection of electric current following electrical breakdown; (b) appropriate electrodes for injection into the medium; (c) signal-controlled current sources for supplying current to the electrodes; and (d) a coherent optical beam whose optical path traverses the region whose index of refraction is varied by the injected current. This modulator can be used for direct phase modulation and for spatial deflection of the coherent optical beam, dependent on the spatial characteristics of the electrodes and the injected current.

---

This invention relates generally to the electronically-controlled phase modulation of a coherent optical or infrared beam, and more particularly to the use of material mediums and structures by which such phase modulation can be accomplished.

Coherent optical beams can be produced by lasers as well as by other means. Various lasers can be used to produce light at various wavelengths in the visible part of the spectrum, in the infrared, or in the ultraviolet parts of the electromagnetic spectrum. The terms "light" and "optical" will be used here to denote any of these spectral regions.

It is well known that an optical phase modulator can be used to impress information on an optical beam which is transmitted through it. It is understood that when such phase information is impressed upon a number of adjacent optical channels spaced closely together, a high density of optical information can be transmitted, e.g., for optical recording purposes. It is also well known that a spatially non-uniform phase modulation impressed upon a coherent optical beam can be used for spatial deflection of the optical beam, wherein the direction of spatial deflection can be controlled by the degree of phase modulation and the spatial gradient of the phase modulation. It is to accomplish such objectives using electronic means alone that the present invention is directed.

It is one purpose of the present invention to accomplish such objectives without the use of high voltages or high modulation power. Another objective is to achieve a phase modulator which is small, rugged, reliable, and uncomplicated. A third objective is to achieve a phase modulator which can give rapid variations in optical phase with high modulation efficiency in short optical paths, namely a large variation in phase over short distances. The maximum acceptable response time in most applications is one millisecond, while many applications require much faster response of the order of a microsecond or less.

A related purpose of the present invention is to achieve a phase modulator for rapid electro-optical spatial deflection of an optical beam. This electro-optical spatial deflector should preferably have the capabilities of high angular resolution, large-angle scanning, fast angular scanning rate, and random access to any angular resolution element.

These attributes are not available in present phase modulators which are usually relatively large, are often complex in structure, are relatively slow in time response, being sensitive only at low frequencies, require high voltages, and give small angular deflection and low resolution unless they are quite large. They also often require high power, and are relatively unreliable.

The present invention on the contrary, can be physically small and requires only low voltages and relatively small power in continuous operation. It permits phase control of many optical spatial channels closely spaced with respect to each other; it is therefore suitable for multiple channel applications and for the control of diffraction patterns. It has fast response to electrical signals leading to high frequency bandwidth. As a spatial beam deflector it can give wide-angle beam deflection with high resolution. The objective of the present invention is to provide any or all of these advantages.

The present invention makes use of a medium which has an S-type current-controlled low resistance region, as shown on an electrical current versus voltage characteristic curve. In such a curve the current is plotted on the ordinate and the voltage on the abscissa. An example of such an S-type characteristic is shown in FIG. 1 which will be described below. A number of different electronic phenomena can give rise to such an S-type current-controlled low-resistance characteristic. Some examples are the following: Breakdown injection in an insulator, in a semi-insulator, or in a glass; some types of avalanche ionization in insulators and high resistivity regions of semiconductors; impact ionization in an insulator, in a semi-insulator, in a glass, or in an appropriate gaseous medium. The operative mechanism which permits any of these electronic phenomena to be used for optical phase modulation is the observed increase in the optical index of refraction which can take place in the spatial region in which such current-controlled low resistance is obtained. I have observed relatively large increases in the index of refraction when large current densities flow in an insulator or semi-insulator following voltage breakdown. For example, in semi-insulating gallium arsenide I have observed an increase in the index of refraction from 3.340 to 3.345 for 1.15 microns infrared radiation when a high current density flows.

The increase in the optical index of refraction is due to an increase in the electronic carrier concentration. It will be shown in the description that in insulators or semi-insulators a substantial current density corresponds to a large increase in the electronic carrier concentration. It will also be shown below that a large increase in the electronic carrier concentration will lead to a substantial increase in the optical index. This increase in the optical index corresponds to an increase in the optical path length and therefore to a modulation of the optical phase of a coherent beam traversing the medium in the region in which the high current density is present.

The physical principle governing this invention can therefore be stated as follows: In a material with low initial carrier concentration the optical index of refraction will increase substantially with increasing electronic carrier concentration. The carrier concentration will increase with increasing current density. Therefore the optical phase can be modulated by varying the current into the medium. Hence a signal-controlled current source or current generator can be used for optical phase modulation. Such a phase modulator can be utilized to produce deflection of an optical beam by setting up a spatial non-uniformity in the increased optical index. For example, if the region of increased carrier concentration is prism-like in shape, the index of refraction of this prism can be modulated by varying the current. This will control the angle of deflection of an optical beam traversing the prism.

This invention will now be described in greater detail by reference to the accompanying drawings wherein.

Figure 1:
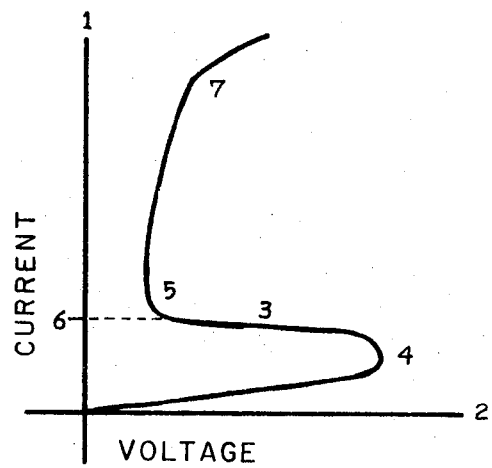
FIG. 1 is a schematic graph of the current-voltage characteristic for a medium exhibiting S-type current-controlled low resistance, in which the electronic concentration can be controlled by the current flow.

Referring to FIG. 1, there is shown a cartesian graph in which current is plotted on the ordinate, denoted 1, and voltage is plotted on the abscissa, denoted 2. This curve, denoted 3, is usually termed the current-voltage characteristic and is shown schematically as an S-shape. The medium has a high-resistivity range extending from the origin to the point denoted 4, in which it behaves like an electrical insulator, permitting only very low currents to flow despite a high applied voltage. This is followed by a region with negative differential resistivity from the point denoted 4 to the point denoted 5, in which current increases as voltage decreases. From point 5 to the point denoted 7, the medium exhibits the current-controlled low resistance in which the current can be increased at will from an external current source, while the resistance of the medium is substantially constant. The current value denoted by point 6 is the threshold value for the current-controlled low resistance region. It is in this current-controlled low resistance region from point 5 to point 7 that the exemplary operation of this optical phase modulator takes place.

Figure 2:
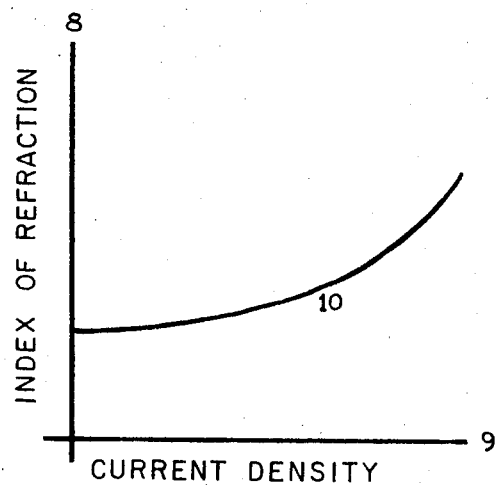
FIG. 2 is a schematic graph showing the variation of index of refraction for such a medium as a function of electrical current density.

Referring to FIG. 2, there is shown a cartesian graph in which the optical index of refraction is plotted on the ordinate, denoted 8, and the current density is plotted on the abscissa, denoted 9. The curve, denoted 10, shows an increase in index of refraction with increasing current density. It is this increase in the optical index with increasing current which permits optical phase modulation in the medium by variation of the current.

Figure 3:
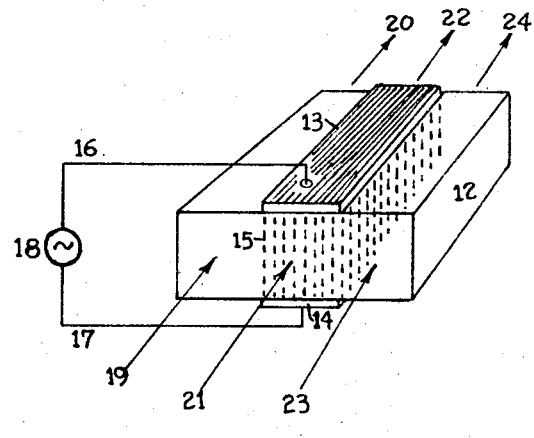
FIG. 3 is a perspective diagram of a simple optical phase modulator utilizing a single pair of electrodes according to the principles of this invention.

Referring to FIG. 3, there is shown a perspective view of a simple two-electrode phase modulator according to the principles of this invention. The bulk medium in which current modulation takes place is denoted 12. Two electrodes on opposite faces of the medium are denoted 13 and 14. The electrode on the upper face, denoted 13, is connected by a conducting path denoted 16 to a current source denoted 18, whose other terminal leads via the conducting path denoted 17 to the electrode on the lower face of the medium, denoted 14. An electrical current, denoted 15 flows through the medium from electrode 13 to electrode 14. It is in the region between the electrodes where current flow takes place that the phase modulation of an optical beam can occur. Optical beams traversing the medium are denoted by arrows 19, 21, and 23, which indicate their directions of propagation. Beam 19, which does not pass through the current region, emerges as beam 20, which is unmodulated. Similarly, beam 23, which does not pass through the current region, emerges as beam 24, which is unmodulated. Beam 21 traverses the current region. It emerges as a phase-modulated beam denoted 22.

Figure 4:
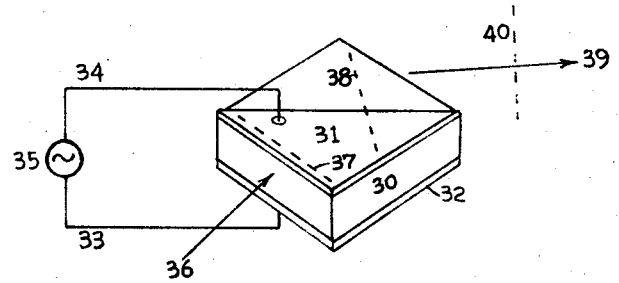
FIG. 4 is a perspective diagram of an optical phase modulator for spatial deflection of an incident optical beam.

Referring to FIG. 4, there is shown a perspective view of a phase modulation configuration which performs angular or spatial deflection of an optical beam, wherein the deflection angle depends on the injected current density. This deflection utilizes triangular injecting electrodes which simulate a triangular prism. The bulk medium is denoted 30. The triangular injecting electrode on the upper face of the medium is denoted 31. A similar metallic electrode on the lower face of the medium is denoted 32. Electrode 31 is connected via an electrical conductor denoted 34 to a signal-controlled current source denoted 35, whose other terminal is connected via an electrical conductor denoted 33 to electrode 32. The path and direction of propagation of a coherent beam of light are denoted by arrow 36, which is shown incident on the medium between the two electrodes. A constant phase front of this incident beam is denoted by the broken line 37. Under high current injection conditions, optical index of refraction beneath the triangular electrodes is increased. The light beam propagating through the medium behaves as it would in an optical prism, corresponding to the triangular region in which the optical index of refraction has been increased. The constant phase front of the optical beam is tilted within the medium as denoted by the broken line 38. When the beam, denoted 39, emerges from the medium, its constant front has been further tilted as denoted by the broken line 40, which is normal to the emerging beam direction 39. Thus the effect of this spatially-varying phase modulation is to produce a deflection of the optical beam from direction 36 to direction 39. This is accomplished by injecting current from the signal-controlled current source through the electrodes into the medium, at current densities corresponding to the current-controlled low resistivity region in which the optical index increases with increasing current flow.

Figure 5:
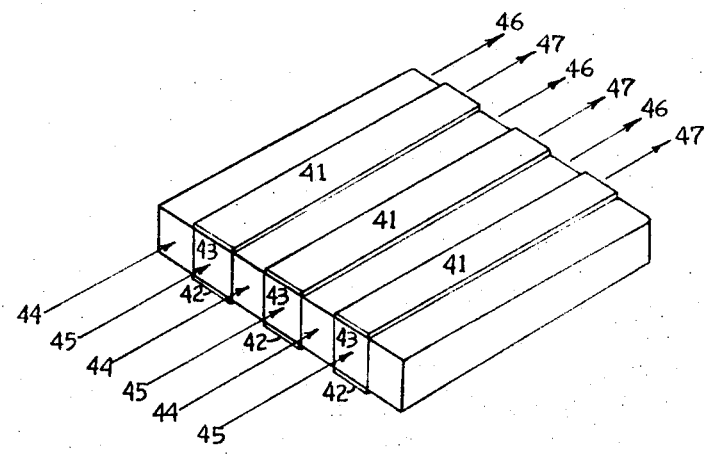
FIG. 5 is a perspective diagram showing a medium for optical phase modulation into which are led a plurality of current injecting electrodes, isolated from one another for individual control of their injection currents.

Referring to FIG. 5, there is shown a perspective view of a medium on which a plurality of electrodes are situated, isolated from one another, with the possibility of individual control of the optical index of refraction under each electrode by control of the current density flowing from it into the medium. There is also shown a plurality of individual optical beams which can be individually phase modulated by traversing the regions whose optical indices are controlled by the current injected by the individual electrodes. The medium in which the index of refraction can be controlled by the current flow is denoted 40. The spaced isolated electrodes on the upper surface of the medium are denoted 41. Electrical connections to individual signal-controlled current generators from each such electrode will be understood to be present although they are not shown. A corresponding set of spaced isolated electrodes present on the lower surface of the medium are shown end-on, denoted 42. Electrical connections to these electrodes will also be understood to be present. The outer faces of the bulk volumes in which current can flow between corresponding electrodes are denoted 43. The optical indices of refraction within these bulk regions can each be individually controlled by the current density injected from the respective pair of electrodes bounding the region. A set of optical beams and their directions of propagation, denoted 45, are shown entering the faces 43. Another set of optical beams denoted 44 is shown entering the medium between the side faces 43. The beams denoted 45 traverse the current flow region between upper and lower electrodes and emerge as phase modulated beams, denoted 47. The beams denoted 44 do not traverse the current flow region between upper and lower electrodes. Therefore, they emerge as unmodulated beams, denoted 46.

Figure 6:
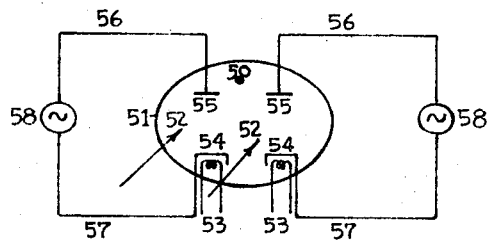
FIG. 6 is a schematic diagram of an optical phase modulator in a gaseous medium in accordance with the principles of this invention.

Referring to FIG. 6 there is shown a schematic diagram of an optical phase modulator in a gaseous medium in accordance with the principles of the present invention. The vacuum container is denoted 51. Within this container is a low pressure gas, denoted 50, which can be partially ionized by impact of electrons. The gas will typically be mercury or a noble gas at pressures less than 50 millimeters. The anode electrodes denoted 55 are shown. Two cathode electrodes denoted 54 are shown which emit electrons toward the anode. The anode electrodes 55 are each connected via an electrical conductor, denoted 56, to a signal-controlled current source denoted 58, whose other terminal is connected to the cathode 54 by an electrical conductor, denoted 57. Cathode heaters denoted 53 can be used to increase the rate of emission of electrons by the cathode. Once the anode-to-cathode voltage has exceeded the potential required for impact ionization there will be a partial plasma present between anode and cathode which will permit the partially ionized gas to operate in the current-controlled low resistance state. The technology of such gas conducting tubes is well known, and is explained in texts on gas tubes, e.g., "Applied Electronics," by M.I.T., John Wiley (1943), chapter 5. Coherent optical beams, denoted by arrows 52, propagating normal to the plane of the anode and cathode, pass through the current conducting regions. Phase modulation of these beams takes place by variation of the optical index of refraction of the gas, which depends on the current density between anode and cathode.

As previously set forth, phase modulation of the coherent beam can be produced by a number of different electronic phenomena. One of these is breakdown injection modulation due to injection of electrons and holes in a solid. Another electronic phenomenon is impact ionization which produces electrons and positive ions, in a solid or in a gas. The physics of the process will now be set forth using the example of breakdown injection modulation by injection of electrons and holes in a solid.

We shall first distinguish between a semi-insulator and an insulator. A semi-insulator is a semiconductor in which deep-level dopant impurities are present which cannot be readily ionized at ordinary temperatures, and in excess of the amounts necessary to compensate normal dopants. Examples are semi-insulating gallium arsenide, and semi-insulating gallium phosphide, gallium arsenide phosphide, and semi-insulating silicon. Many semiconductors can be made semi-insulating by introducing a sufficient concentration of deep level impurities. The difference between a semi-insulating semiconductor and an insulator is that the insulating properties of the semi-insulating semiconductor result from the concentration of deep-level dopant impurities which are present.

One basic phenomenon that can lead to injection modulation of the refractive index is the injection of electrons and holes into an insulator or semi-insulator. This injection current is usually very small in an insulator because the current consists predominantly of electrons, which set up a repulsive space charge. If enough holes were injected to give space charge neutrality, the current would be much greater. In such semi-insulators, however, there is usually a high density of hole traps which capture any injected holes near the anode. It is only after the hole traps are filled (or saturated) by capture of holes, that the injected holes can go from anode to cathode and establish space charge neutrality in the entire region between them. This takes place at the breakdown voltage.

Once the space charge limitation of the semi-insulator is overcome by the filling of the hole traps, a drastic increase in the hole lifetime takes place and high electron and hole currents can be injected. The large injection current carries high concentrations of electrons and holes into the insulator from the injecting electrodes. It is these high electron carrier concentrations which modify the optical index of the bulk material wherever they are present.

It is apparent from this description of the basic phenomenon that the switching time of the device from its insulating state to its high injection state is a fraction of the transit time of a hole from anode to cathode. This transit time is of the order of a microsecond in a typical gallium arsenide device, leading to a switching time of a few hundred nanoseconds.

The electronic characteristics of such a material can be described as follows:

(1) It is bi-stable with respect to electrical resistivity. Before breakdown the device is in a high resistivity state, i.e., it is an insulator with resistivity typically of $10^4$ ohm-cm. or more. After breakdown, it is in a very low resistivity state with resistivity of the order of 10 ohm-cm.

(2) The current-voltage curve (current as the ordinate, voltage as the abscissa) displays an S-like negative resistance beyond the breakdown voltage point. Beyond the negative resistance region following voltage breakdown there is a current-controlled resistance range in which the resistance is low. The resistance is stable in this region with respect to current fluctuations.

(3) In this current-controlled resistance region, relatively small voltages lead to large currents and large current-controlled carrier concentration.

(4) When the injected carrier concentration leads to plasma frequencies of the same order as the optical frequency, large increases in the dielectric constant, and therefore in the optical index of refraction take place. It is found that these changes in the optical index can be precisely and reproducibly controlled by the injection current in the current-controlled resistance range. Modulation of this injected current by a wide-bandwidth current generator leads to correspondingly rapid modulation of the optical index of the material, and to a corresponding spatial deflection of the laser beam traversing a prism-like region within the device. An electronic signal source acting as a scan generator can then modulate the current generator to produce any desired spatial deflection time pattern, consistent with its bandwidth limitation.

A basic understanding of breakdown injection modulation prisms must encompass two points:

(1) The dependence of the dielectric constant on the electron carrier concentration
(2) The phenomenon of breakdown injection modulation We will now comment on these two points.

The dependence of the dielectric constant, whose square root is the index of refraction, on the electron carrier concentration, is a well known physical fact, explainable by classical physics (see Lipson and Lipson, "Optical Physics," Cambridge University Press (1969), page 316) as well as by quantum mechanics (see Moss, "Optical Properties of Semiconductors," Buttersworth (1961), page 322). The fundamental explanation is the coherent scattering of incident optical radiation from the hole-electron plasma which the electronic carrier concentration comprises. This coherent scattering gives rise to a contribution to the dielectric constant. This phenomenon is well known from classical dispersion theory.

The phenomenon of breakdown current injection is unlike other negative resistance phenomena in semiconductors in the following respect. Most negative resistance phenomena, e.g., the Gunn effect, are due to voltage-controlled instabilities. Breakdown current injection, on the other hand, is a current-controlled instability. It requires a semi-insulating semiconductor which has the following characteristics:

(1) Very low equilibrium concentration of electronic carriers without current injection. In gallium arsenide this concentration often is less than $10^{12}$ cm.$^{-3}$.

(2) Capability for electronic injection of both electrons and holes. This implies that ohmic injecting contacts can be made in the material.

(3) A deep-level acceptor concentration must be present as a deep-level hole trap which can be saturated or filled by absorption of a sufficient concentration of holes.

(4) Because of this concentration of hole traps, the hole lifetime will be much less than the electron lifetime, until the hole traps are saturated. After this saturation takes place (by filling of the traps) the electron and hole lifetimes will be comparable.

(5) It is necessary of course for the material to be transparent to the laser radiation.

The preceding microscopic properties of the material will lead to the following electrical and optical properties:

(1) The material must be bi-stable with respect to resistivity, having both a high resistivity state before breakdown and a low resistivity state while breakdown injection takes place.

(2) An S-like negative resistance electrical characteristic will be present when current is plotted on the ordinate and voltage on the abscissa. A current-controlled low resistance range will be present.

(3) There will be a range of currents and voltages in which small voltage changes lead to large currents. There will then be a current-controlled excess carrier concentration.

(4) The injected carrier concentration must lead to a plasma frequency of the same order as the optical frequency.

The increase in electron and hole concentrations by a large factor above the normal concentration is due to neutralization of the electron space charge near the cathode which, in an insulator, normally limits the current flow. This space charge repels any substantial electron flow. If a sufficient hole concentration is present near the cathode to give space charge neutrality, large current flow will be impossible. In the pre-breakdown range, the injected holes are immobilized near the anode by the trap concentration. As the voltage is increased more holes are injected, which are captured by traps; this process continues until the traps are all saturated, i.e., until they are filled by hole capture. At this point injected holes can go from anode to cathode to establish space charge neutrality in the entire region under the injecting triangular contacts. This is the breakdown condition.

Once the space charge limitation of the semi-insulator is overcome by the filling of the hole traps, a drastic increase in the hole lifetime takes place. High electron and hole concentrations can be injected. The large injection current carries high concentrations which modify the optical index of the bulk material wherever the excess carrier concentrations are present. It will be pointed out in the description to follow that excess concentration will be proportional to the injection current. Therefore, control of this current leads to control of the carrier concentration which modulates the index of refraction in the manner which has been described.

The upper frequency limit on the operation of the breakdown injection prism is determined by the transit time of the injected electrons and holes in the plasma across the gallium arsenide wafer. For example, consider a case in which the wafer thickness L is 20 mils=0.05 cm. The ambipolar drift velocity $v_d$ will be given by $$v_d = \mu E$$

where $\mu$ is the ambipolar mobility and E is the electric field strength under breakdown injection conditions. In gallium arsenide, $\mu=200$ cm.$^2$/volt. sec. and typical values of E=200 volt/cm. have been measured. Therefore, $$v_d = 4 \times 10^4 \text{ cm./sec.}$$

and the transit time $t$ will be of the order of $$t = \frac{L}{v_d} = \frac{0.05}{4 \times 10^4} = 10^{-6} \text{ second}$$

Since the transit time will be of the order of a microsecond one can expect the beam steerer to have a bandwidth of 1 to 10 megacycles. If closer spacing of the electrodes is maintained, or if the device is operated at higher field strengths, the frequency bandwidth can be increased.

The basic injection physics of optical index modulation by current injection is demonstrated by the data of Table 1. This experimental data was taken for a phase modulator in the form of a triangular prism as shown in FIG. 4. This type of measurement is useful for demonstrating the principle of the phase modulation. In this experiment, the deflection angle of a 1.15 micron laser beam is given as a function of injection current and of the applied voltage. The power dissipation, calculated as the ohmic heat generation I$^2$R is also given. This triangular prism has a

TABLE 1

[Laser beam deflection vs. electric injection current for typical prism device in the breakdown range]

| Applied potential (volts) | Current (milliamperes) | Power dissipation (milliwatts) | Laser beam deflection (milliradians) |
|---|---|---|---|
| 0 | 0 | 0 | 0 |
| 10.6 | 0.47 | 50 | 0.74 |
| ... | ... | ... | ... |
| 20 | 15.0 | 300 | 8.45 |
| 17.9 | 18.0 | 320 | 9.55 |
| 16.3 | 20.0 | 326 | 9.90 |
| 14.3 | 24.5 | 350 | 11.75 |
| 12.9 | 28 | 360 | 13.2 |
| 12.3 | 30 | 370 | 14.7 |
| 12.0 | 32 | 384 | 15.4 |
| ... | ... | ... | ... | base of 50 mils and a triangle altitude of 250 mils. The deflection of 15.4 milliradians is just under one degree. When this prism was used with a double lens beam contractor (reverse telescope) the angular deflection was magnified to 30°. It is apparent from the table that in the breakdown injection range, the laser beam deflection is proportional to the current. The use of such a phase modulation prism for beam deflection will now be described.

A schematic diagram of the breakdown injection modulating prism has been shown in FIG. 4. This may consist, for example, of a wafer of semi-insulating gallium arsenide 20 to 40 mils thick, on which metallic triangles have been evaporated on top and bottom. An electric current of the order of several hundred milliamperes (depending on the heat-sinking and on the size of the metallized triangles) is injected into the gallium arsenide by breakdown injection at voltages of 10 to 20 volts. When this injection takes place, the dielectric constant of the material is modified.

Typically, the dielectric constant of gallium arsenide, which is 3.34, is increased by 0.005 by breakdown injection. Greater or lesser changes are obtained as the current is varied. The triangular shape of the electrodes leads to a difference in phase across a coherent infrared beam propagating in the gallium arsenide. The phase retardation $\Delta\phi(x)$ at a position $x$ along the width of the beam is given by $$\Delta\phi(x) = \frac{2\pi}{\lambda} \cdot (\Delta n \cdot L(x))$$

where $\Delta n$ is the increase in refractive index under the metal triangles and $L(x)$ is the length of optical path traversed by a ray at position $x$ under the triangle. The fact that the refractive index increases only under the metal triangles where the injection current flows is the physical basis of the beam steering element. The refractive index does not increase in that part of the optical path which is not under the current-injecting metal triangle.

If L=100 mils (=2500 microns) and $\lambda$=1.06 microns, then a $\Delta n$ of 0.005 leads to a phase increase of 12.5 times $2\pi$. Thus the phase change from one edge of the triangle, where L=0, to the other edge of the triangle, where L=100 mils is 12.5 times $2\pi$. The equi-phase fronts propagating through the gallium arsenide are then tilted as shown in FIG. 4 because of the difference in phase across the beam width. This is the essential beam deflection mechanism.

If W is the width of the beam, the angle of steering is given by $$\theta = \text{arc sin} \frac{\Delta n L}{W}$$

In the example discussed here, $\Delta n L/W = 12.5\lambda/W$. Thus if W=50 mils =1250 microns, one obtains a steering angle of about 10 milliradians=0.6 degrees. If $\Delta n$ is smaller than 0.005 the angle of steering will be proportionately smaller. If $\Delta n$ is greater than 0.005, the angle of steering will be proportionately larger.

It is known that optical demagnification of the propagating infrared beam increases the steering angle proportionate to the demagnification factor. Thus a $60\times$ beam contracting optical system increases the steering angle to about 36 degrees. Such large beam deflections have been observed.

In discussing the direction of light deviation, it is useful to define metallized electrode regions as right-handed and left-handed triangles. Consider a metallized region in the form of a right triangle, with a laser beam incident upon its base. We call this a right-handed triangle if its hypotenuse faces to the left, and a left-handed triangle if its hypotenuse faces to the right. Note that a right-handed triangle can only deflect the beam to the right and that a left-handed triangle can only deflect a beam to the left. In order to obtain both senses of deflection, two such triangles in sequence are necessary. Only one triangle will be injecting current at any time. The current injecting triangle which is energized will determine the sense of the deflection and the injecting current will determine the angle of deflection.

The resolution N obtained with this system is given by $$N = \Delta n \frac{L}{\lambda} \frac{W_b}{W}$$

where $W_b$ is the width of the laser beam and $W$ is the width of the triangle. If a beam expander is used to make $W_b = W$ one has a resolution $$N = \Delta n \frac{L}{\lambda}$$

Thus for a triangle length L=1 cm., with $\Delta n$=0.05, one obtains a resolution N=500 while for a 10 cm. length one obtains a resolution of N=5000.

Resolution may be interpreted as the number of individual angle elements to which the beam can be steered. For example, if the laser beam has an angular divergence of $\Delta \theta$=0.2 milliradian and a resolution N=5000 can be obtained, the maximum beam deflection $\theta$ is given by $$\theta = N\Delta\theta = 1000 \text{ milliradians}$$

Thus in general, $$N = \frac{\text{maximum beam deflection}}{\text{angular divergence of laser beam}} = \frac{\theta}{\Delta\theta}$$

It can be shown that N is unaffected by any passive optical system whose aperture is large enough to accept the input and output beams. It is for this reason that N is a convenient measure for the beam deflection capability. An optical system such as a beam contractor (reversed telescope) can magnify beam steering angles without affecting the resolution, while a beam expander (conventional telescope) can be used to conform (enlarge a laser beam to the dimensions of the aperture.

A large prism of semi-insulating gallium arsenide or of other insulating or semi-insulating material will be practically non-absorbing for infrared radiation.

The remarkable fact about this beam steering element is that such a large increase in the index of refraction as 0.005 can be obtained by breakdown current injection into semi-insulating gallium arsenide. I have found that for each 8 mils of optical path length one can obtain $2\pi$ radians of phase advance at an injection breakdown current density of 1 ampere per cm.$^2$ of triangle area in an average specimen.

Experimentally, one often finds that the index of refraction of semi-insulating gallium arsenide increases with increasing current density in linear fashion with an increase of 0.001 in index for each 200 milliamperes per square centimeter. One should note that this effect does not take place in normally doped gallium arsenide. The physics of this injection current control of the index of refraction in semi-insulating gallium arsenide can be explained as follows:

Consider a free electron gas in a solid. The relative dielectric constant $\epsilon/\epsilon_0$ due to this free electron gas is given by $$\frac{\epsilon}{\epsilon_0} = 1 + \frac{\Omega^2}{\omega^2}$$

where $\Omega$ is the plasma frequency and $\omega$ is the angular frequency of the optical radiation. $\Omega$ is given in terms of the electron density N, the electron charge $e$, the dielectric constant $\epsilon_0$, and the electron mass $m$, by $$\Omega = \left(\frac{4\pi N e^2}{\epsilon_0 m}\right)^{1/2}$$

In the breakdown injection region, N is proportional to the current density $j$ in accordance with the expression $$j = Ne\mu E$$

where $\mu$ is the effective electron mobility and E is the electric field. Thus for a given $j$, N is given by $$N = \frac{j}{e\mu E}$$

Note that in a plasma the mobility will not be the electron mobility $\mu_e$ since electrons and holes move together. The correct mobility to use is the ambipolar mobility, which is given in terms of electron and hole mobilities as follows:

$$\mu = \frac{H-N}{\frac{H}{\mu_e}+\frac{N}{\mu_h}}$$

where H is the hole density. In gallium arsenide where $\mu_h = \frac{1}{10} \mu_e$ and $N > H$, one has $$\mu \approx -\mu_h$$

This negative sign leads to an increase in the index of refraction rather than a decrease, which would be found in a pure electron gas.

When one inserts the appropriate numerical values into the expressions given above, one finds that the change in the optical index can be correctly predicted from the electric current values.

While the experiments described above utilized semi-insulating gallium arsenide, it is apparent, that many other transparent insulators, semi-insulators, and amorphous glasses which display breakdown injection can be used for similar experiments. Values of $\Delta n$ considerably larger than those reported above can be obtained. Response times for current variations will depend on the material and on the spacing between electrodes. A maximum time response for a usable phase modulator is about 1 millisecond, since greater values will give too narrow a frequency band.

The description given above concerned materials in which injection of holes to saturate traps was the basic electronic phenomenon causing breakdown injection. Other phenomena will produce breakdown injection in some solid insulators and semiconductors, e.g., impact ionization. Impact ionization will also be the basic phenomenon in a gaseous optical phase modulator.

In a gas the increase in electron and positive ion concentration by a large factor above the normal concentrations is due to impact ionization of the gaseous molecules which are present. The critical voltage condition is a condition that a plasma be established in which electrons will be present with sufficiently high speed to produce large numbers of additional electronic carriers by impact ionization. Once this voltage has been exceeded one is in the "constant voltage range" of the tube. Thus, increasing the voltage by even a small amount in this constant voltage range produces a large additional electronic carrier concentration, leading to a large increase in current. Therefore, control of this current leads to control of the carrier concentration, which modulates the index of refraction in the manner which has been described.

This type of current-controlled electronic carrier concentration is similar to phenomena which have been observed in some gas discharge tubes. For example, the gas rectifier and control tubes which are widely used in industry show this type of behavior. Such tubes utilize low pressure noble gases or heavy vapors, e.g., mercury, at pressures of 1 to 50 millimeters.

Impact ionization in a semi-insulator or insulator can also increase the electron and hole concentrations by a large factor above the normal concentrations by ionization of the deep level impurities which are present in the material.

The system for utilizing a breakdown injection phase modulator will consist of the following components:

(1) Beam expansion optics for focussing the laser beam onto the optical phase modulator.

(2) Optical phase modulator operating by breakdown injection. The geometry of the electrodes will determine the function of the modulator, i.e., single or multi-channel information modulation, spatial beam deflection, etc.

(3) Beam contraction optics for spatial deflection systems.

(4) One or more signal controlled current sources for modulation of the injection current. This may consist of a high current radio frequency amplifier. Two such current sources will be required for two-dimensional reflection.

(5) A breakdown initiator. This is a high-voltage (about 200 volts) pulse generator for initiating breakdown. It can be fabricated in an integral unit with the current source.

(6) A scan generator to produce the scan signal for the current source. Alternatively, programmed signals from other sources, e.g., a digital computer can be used.

Most applications will differ from each other primarily in the geometry of the optical modulator and in the scan generator required to produce the various input signals.

An example of the specifications on a prism type spatial beam deflector for infrared radiation, in accordance with the principles of this invention, are the following:

Prism material: Semi-insulating gallium arsenide with deep level acceptor (chromium or oxygen) concentration of $10^{17}$ cm.$^{-3}$.

Configuration: Right-handed triangle prism followed by left-handed triangle prism, in line.

Prism dimensions: 4 cm. by 1 cm. by 40 mils thick with cleaved edges and anti-reflective coating for light entry and exit.

Triangle metallization: 4 cm. length by 400 mils width on top and bottom of wafer directly opposite each other.

Thermal dissipation design: 2 cm. thick copper triangle heat sinks soldered to triangle metallized regions. Air conduction fins are soldered to these copper heat sinks.

Electrical contacts: Electrical contacts are soldered directly onto the copper heat sinks.

The design of optical systems as the first and third elements of this system are well known. These will be one or two-dimensional beam expanders or beam contractors, which are similar to conventional telescopes or inverse telescopes.

It will be understood that some applications of this invention will require a spatial variation of the optical index of refraction within the medium. This spatial variation will be required across the width of the optical beam normal to the direction of propagation in a beam deflector. It will be required in a number of discrete spatial channels in a multichannel information modulator. Numerous such examples can be given.

It will be understood that such spatial variations in the index of refraction can be obtained in the present invention by setting up corresponding spatial variations in the current density within the medium. A number of mechanisms can be used for obtaining spatial variations in the current density. Spatial variations in the current density can be produced, for example, by placing the medium within a magnetic field, either homogeneous or inhomogeneous. Spatial variations in the current density can be produced by means of a multiplicity of electrodes, wherein only certain selected electrodes will carry a current. The spatial pattern of the electrodes can be utilized to give a spatial variation in the electron density, since only in the region between electrode sets of opposite potential will current flow. The dimensions of the electrodes parallel to the direction of optical propagation will be important for this dimension will determine the length of optical path for that portion of the optical beam traversing the medium between pairs of electrodes. The total current flowing between a pair of electrodes will also determine the current density in the inter-electrode region. Hence variation of the total currents passing between pairs of electrodes can be used to provide the required spatial variation of the current density.

One can now review these means of obtaining a spatial variation of the current density:

It is well known that a uniform magnetic field normal to an electric current flow will produce an inhomogeneity in the spatial distribution of the electric current. This phenomenon gives rise to the Hall effect and to the Ettinghausen and Suhl effects. The magnetic field tends to concentrate the current flow in one part of the medium and to diminish it in other parts. An inhomogeneous magnetic field produces the same effect with greater spatial complexity.

It is apparent that the spatial pattern of the electrodes can be positioned upon the surfaces of the medium to provide a desired spatial variation in the current. This spatial variation in the current will produce a corresponding spatial pattern of variations in the index of refraction.

The spatial pattern of electrodes may comprise a desired variation in length among the electrodes, in a direction parallel to the optical propagation direction. The optical beam entering the medium may be considered composed of a number of parallel sub-beams, each propagating in the direction of the entering beam. If each sub-beam passes between a pair of electrodes, the change in phase which it will experience will be proportional to the product of the length of the electrodes in the direction of propagation and the current density between them, which determines the change in optical index. Hence the spatial variation of the phase modulation, being proportional to the product of $\Delta nL$, can be obtained by variation of either the current density between electrodes, to which $\Delta n$ is proportional, or to variation in the length $L$ of the electrodes.

It is apparent that the electrodes can be deposited on the surfaces of the medium in any pattern of isolated individual metallized regions, wherein any pair of electrodes in close proximity to one another can be utilized to pass a current through the medium between them, thus increasing the index of refraction between these two electrodes. One particular form of this configuration is a set of spaced rectangular strips on each surface of a medium with two large-area surfaces opposite one another. The individual strips may all be of equal length, in which case the current density between two strips determines the phase of a beam propagating parallel to the strips. An alternative configuration can utilize strips of unequal length, in which case, with a constant current density, the length of the strips will determine the phase changes parallel to the strips. These configurations apply in particular to a thin medium, e.g., a wafer of large area in two dimensions. In a configuration with a set of electrodes which can be individually selected for injection of current, one can obtain a desired spatial variation of the index of refraction by pairwise selection of pairs of adjacent electrodes, wherein the current into each such pair is selected to give the desired change in index of refraction, according to the relation between $\Delta n$ and current density previously disclosed.

A medium with substantial area in three dimensions can also be utilized, wherein a set of electrodes can be deposited on surfaces in three dimensions. When these are utilized to produce a three-dimensional current density variation, and a corresponding three-dimensional variation in optical index of refraction, one can obtain three-dimensional variations in phase and in deflection angle.

A medium in which injection modulation of the index of refraction takes place can be utilized in an interference type of beam deflector based upon the use of a pair of almost parallel mirrors enclosing said medium. In such an intereference type beam deflector the mirrors are almost completely reflecting. However they have a sufficient transmittivity to permit a small fraction of the incident radiation to pass through. The effect is to produce a number of parallel outgoing beams by multiple reflection of a beam incident from the side. The phase relationship between these beams will depend upon the index of refraction of the medium between the mirrors. In the present invention a medium in which injection modulation takes place will be used. The index of refraction of the medium will be varied by varying the current density. This will vary the phase relationship between the individual transmitted beams, thus permitting a deflection of the beam by interference effects.

It will be understood that the optical aperture of the medium may not be equal to the aperture of the incident beam. An optical system could be provided to demagnify the aperture of the incident beam to equal the aperture of the medium, or to match the two apertures more closely. Such an optical system could comprise an optical demagnification system, also called a beam contractor, whose technology is well known. A beam contractor can be formed using lenses or optical fibers. Correspondingly, the output of the medium can be magnified to restore the beam to its original aperture by means of a beam expander.

While the theory of this novel optical phase modulator and structural embodiments relating to it have been set forth above, it will be appreciated that other obvious variations can be made in carrying out the invention disclosed herein. Accordingly such variations falling within the purview of this invention may be made without in any way departing from the spirit of the invention or sacrificing any of the attendant advantages thereof, providing however that such changes fall within the scope of the claims appended hereto.

What is claimed is:

1. An optical phase modulator comprising
   (a) a breakdown injection medium in which the electronic carrier concentration increases with increasing electric current density and decreases with decreasing electric current density whenever said current density exceeds an electrical breakdown threshold value
   (b) means to cause said current density in said medium to exceed said threshold value comprising at least two spaced electrodes which pass electrical currents through said medium and at least one signal-controlled current source connected to said electrodes
   (c) means for directing at least one optical beam along a path traversing the regions of current flow between said electrodes in said medium wherein the medium is transparent to said optical beam, and wherein changes in the optical index of refraction of said medium are obtained by variation in said electronic carrier concentration arising from variations in said current density, said current density variation being obtained from variation in said signal-controlled current source, said variation in the optical index leading to modulation of the optical phase of said beam.

2. An optical phase modulator comprising
   (a) a breakdown injection medium in which the optical index of refraction at each point is controlled by the electrical current density at said point whenever said current density exceeds an electrical breakdown threshold value
   (b) means to cause said current density in said medium to exceed said threshold value comprising at least two spaced electrodes which pass electrical currents through said medium and at least one signal-controlled current source connected to said electrodes
   (c) means for directing at least one optical beam along a path traversing the region of current flow between said electrodes in said medium wherein the medium is transparent to said optical beam, and wherein changes in the optical index of refraction of said medium are obtained by variation in said current density, said current density variation being obtained from variation in said signal-controlled current source, said variation in the optical index leading to modulation of the optical phase of said beam.

3. An optical phase modulator as defined in claim 1 wherein the medium is a semi-insulating semiconductor.

4. An optical phase modulator as defined in claim 1 wherein the medium is an electrical insulator.

5. An optical phase modulator as defined in claim 1 wherein the medium is an amorphous insulating glass.

6. An optical phase modulator as defined in claim 1 wherein the medium is semi-insulating gallium arsenide.

7. An optical phase modulator as defined in claim 1 wherein the medium is semi-insulating gallium arsenide phosphide.

8. An optical phase modulator as defined in claim 1 wherein the medium is semi-insulating gallium phosphide.

9. An optical phase modulator as defined in claim 1 wherein the medium is a low pressure gas operated in its constant voltage range, and wherein at least one of the said electrodes emits electrons into the gas.

10. An optical phase modulator as defined in claim 1 wherein spatial variations in the optical index of refraction are produced by means of spatial variations in the current density.

11. An optical phase modulator as defined in claim 1 wherein spatial variations in the index of refraction are produced normal to the direction of optical propagation by means of spatial variations in the current density normal to the direction of optical propagation.

12. An optical phase modulator as defined in claim 11 wherein at least three said electrodes are present and wherein said spatial variations in the current density are produced by means of variation in the total current between selected pairs of said electrodes.

13. An optical phase modulator as defined in claim 11 wherein said spatial variations in the current density are produced by means of spatial variation in the dimension of at least one said electrode, normal to the direction of optical propagation.

14. An optical phase modulator as defined in claim 13 wherein at least one said electrode is triangular in shape.

15. An optical phase modulator as defined in claim 11 wherein a difference in optical path length is produced across the beam width perpendicular to the direction of optical beam propagation, said optical phase modulator thereby producing spatial deflection of the optical beam propagating therein, said spatial deflection being variable by means of variation of the current density from at least one of the said electrodes.

16. An optical phase modulator as defined in claim 11 wherein the electrodes comprise a discrete set of areas isolated from one another, and wherein current flows from at least one said current source to said discrete electrodes are capable of variation.

17. An optical phase modulator as defined in claim 11 wherein the electrodes comprise a set of spaced rectangular strips, and wherein current flows from at least one said current source to said spaced rectangular strips are capable of variation.

18. An optical phase modulator as defined in claim 1 wherein a plurality of discrete electrodes are present, wherein said current flows from at least one said current source across any pair of electrodes are capable of variation, said optical modulator thereby producing spatial deflection of the optical beam propagating therein, said spatial deflection being variable by means of variation of the current density from at least one said pair of electrodes.

References Cited

UNITED STATES PATENTS

| | | | |
|---|---|---|---|
| 3,447,855 | 6/1969 | Skinner | 350—160 |
| 3,436,679 | 4/1969 | Fenner | 331—94.5 |
| 3,458,247 | 7/1969 | Bohrer et al. | 350—160 |

OTHER REFERENCES

J. B. Gunn: "Light Modulator & Optical Logical Devices," IBM Tech. Discl. Bul., vol. 7, No. 12, May 1965, pp. 1202–5.

IEEE Proceedings, vol. 53, No. 5, May 1965, p. 522.

Fowles & Schlaffer, "Survey of Laser Beam Deflection Techniques," Applied Optics, vol. 5, No. 10, October 1965, pp. 1675–81.

RONALD L. WIBERT, Primary Examiner

J. ROTHENBERG, Assistant Examiner